(12) United States Patent
Watabe

(10) Patent No.: US 7,304,928 B2
(45) Date of Patent: Dec. 4, 2007

(54) LASER POWER CONTROL TECHNIQUE AND APPARATUS FOR RECORDING AND REPRODUCING DATA IN AND FROM OPTICAL DISK UNDER LASER POWER CONTROL

(75) Inventor: Teruyasu Watabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 545 days.

(21) Appl. No.: 10/845,410

(22) Filed: May 14, 2004

(65) Prior Publication Data

US 2004/0257964 A1   Dec. 23, 2004

(30) Foreign Application Priority Data

May 16, 2003   (JP)   ............................. 2003-138897
May 16, 2003   (JP)   ............................. 2003-138910

(51) Int. Cl.
*G11B 7/00*   (2006.01)
(52) U.S. Cl. ................. 369/47.53; 369/47.51; 369/116; 369/47.5
(58) Field of Classification Search .................. None
See application file for complete search history.

(56) References Cited

U.S. PATENT DOCUMENTS 5,008,888 A * 4/1991 Numata et al. ........ 372/29.014
5,146,464 A * 9/1992 Uemura ........................ 372/26
5,793,737 A * 8/1998 Den Boef ................ 369/47.53
5,930,464 A   7/1999 Nakayama et al.
5,943,086 A   8/1999 Watabe et al.
6,426,929 B1  7/2002 Watabe et al.
6,747,935 B2  6/2004 Watabe
7,212,477 B2 * 5/2007 Watabe ...................... 369/47.5
2002/0018419 A1 2/2002 Watabe

FOREIGN PATENT DOCUMENTS

JP   9-171631     6/1997
JP   2002-358682  12/2002

* cited by examiner

*Primary Examiner*—William R. Korzuch
*Assistant Examiner*—Jorge L. Ortiz Criado
(74) *Attorney, Agent, or Firm*—Dickstein Shapiro LLP

(57) ABSTRACT

A laser power control apparatus for controlling the output power of a semiconductor laser used to record and reproduce data in and from a recording medium is provided. The laser power control apparatus includes a controller configured to vary the peak output power level of the semiconductor laser in a stepwise manner, calculate a differential efficiency at each of the varied peak output power levels, and determine a laser driving current based on a relation between the differential efficiency and the peak output power level. In addition, a laser driving unit is configured to drive the semiconductor laser using the laser driving current determined by the controller.

19 Claims, 18 Drawing Sheets

OUTPUT PULSE SHAPE

OUTPUT PULSE SHAPE

OUTPUT PULSE SHAPE

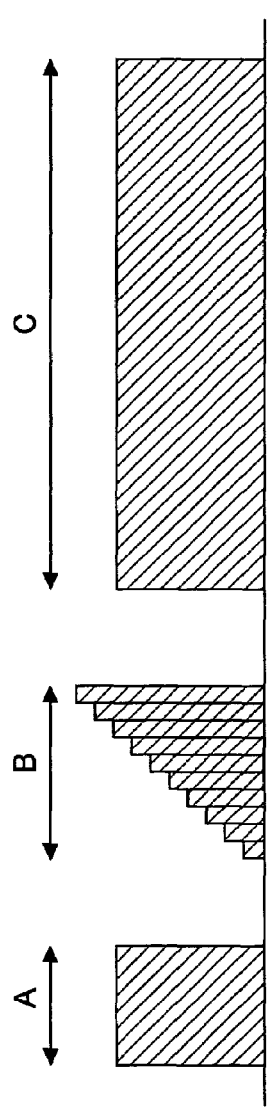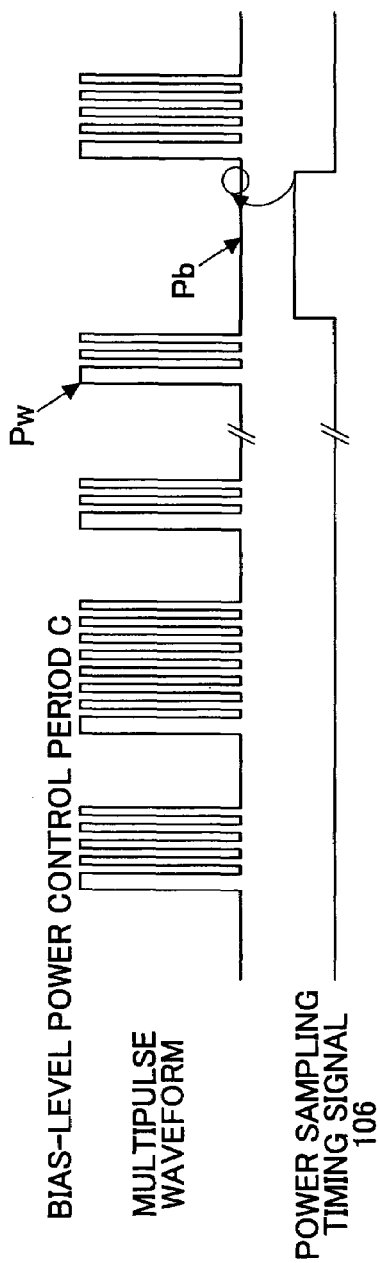
FIG.10A FIG.10B FIG.10C

LASER POWER CONTROL TECHNIQUE AND APPARATUS FOR RECORDING AND REPRODUCING DATA IN AND FROM OPTICAL DISK UNDER LASER POWER CONTROL

BACKGROUND OF THE INVENTION

1. Field of the Invention

The present invention relates to a laser power control technique required when recording and reproducing data in and from optical recording media, such as DVD disks, with a laser beam.

2. Description of Related Art

Along with wide use of multimedia, various types of read-only storage media (such as music CDs, CD-ROMs, and DVD-ROMs), as well as playback equipment, are in practical use. Recently, phase-change recording media have come to the front, in addition to recordable disks using dye-type media and rewritable MOs using magneto-optical (MO) media. Especially, rewritable DVDs are attracting a great deal of attention as the next-generation multimedia recording media and as large-capacity storage media.

In phase-change media of optical data storage, the phase of the recording layer changes in a reversible manner between the crystalline state and the amorphous state when recording and reproducing data. Unlike MO media, phase-change media do not require an external magnetic field. Data can be recorded and reproduced using only a laser beam emitted from a laser diode (LD), and overwrite recording can be performed by erasing recording data with a laser beam in one pass.

FIG. 1 is a timing chart showing an ordinary multipluse waveform used to record data in dye-type recording media. For dye-type media, a single pulse waveform is generated based on, for example, eight-to-sixteen modulation to record data on the dye-type recording layer. However, a single pulse recording method has such a problem that the recording mark written on the recording layer deforms into a tear-drop shape due to heat accumulation. To overcome this problem, it is proposed to produce a multipulse waveform of a laser beam based on EFM modulation, as an LD output waveform strategy, when forming marks on the recording layer. The 8 to 16 EFM signal and the multipulse waveform are indicated by symbols (b) and (c), resepectivcely, in FIG. 1.

As an example of the multipulse irradiation, it is proposed to produce a head pulse and subsequent pulses for heating the recording layer to define a mark.

FIG. 2 is a timing chart showing an ordinary multipulse waveform used to record data in phase-change recording media. Again, a laser beam with a multipulse waveform is produced to form a mark, but this waveform has multiple levels of recording power, as indicated by symbol (c).

For recording data in dye-type or phase-change recording media, it is necessary to correctly control the output power of the laser diode (LD). However, the driving current vs. output power characteristic of a laser diode easily fluctuates due to self-heating. In order to stabilize the output power, automatic power control (APC) is performed generally. In automatic power control, a portion of the laser beam emitted from the laser diode is guided onto a photo detector (PD), and laser driving current is controlled using a monitor current generated by the photo detector in proportion to the output power of the laser diode.

In general, a radio frequency electric current is superposed on the laser driving current to reduce noise. Considering only the data reproducing aspect, the APC can be realized easily by constructing a feedback loop of a relatively low frequency band because the laser driving current itself is a direct current.

On the other hand, when conducting the APC during the recording operation, laser power control becomes more difficult because the laser output power has to be changed at high speed to form marks and spaces. The recording power may be controlled to some extent with a simple structure as in data reproduction, by constructing a feedback loop of a low frequency band making use of the fact that the digital sum value (DSV) of the recorded data becomes zero in CD or DVD disks. However, the recording power cannot be controlled accurately.

To improve the control accuracy of the recording power, a sample and hold circuit may be used. For example, when data of the maximum length of 11T consisting of marks and spaces are recorded in a CD-R (dye-type) medium using the strategy indicated by symbol (c) in FIG. 3, the output power is sampled and held for each mark and each space. With this method, the recording power can be controlled more accurately at relatively low cost.

However, multipulse laser output is desired to record data in DVD disks of both dye-type and phase-change type, as has been explained above. For this reason, using a sample and hold circuit is unrealistic because high-frequency control is required for the light-receiving system and the subsequent stages.

To overcome this problem, JP 9-171631A proposes to appropriately insert a non-pulse driving period in the laser output waveform to control the output level of the laser between the amorphous level (at peak power) and the reading level (at bottom power) during the data recording operation in a phase-change medium.

However, if this technique is applied to the recording power control for mark formation in a dye-type medium based on the recording strategy shown in FIG. 1, a correct recording mark cannot be formed due to consecutive heating, and consequently, an area in which the recording operation is conducted during the non-pulse period results in a defective spot. This defective spot has little effect on the reproducing operation as long as error correction is carried out because automatic power control (APC) is implemented at a relatively long interval.

As to power control for space formation, the output power for forming a space is generally a constant power, and it can be controlled without causing defect in the recorded data by sampling and holding the output power at the timing of writing relatively long space data. This means that the space recording power can be controlled at a shorter interval as compared with the mark recording power.

Since the optimum level of the recording power varies depending on the surrounding temperature, as well as on type of the recording medium and the linear velocity, the recording power is optimized through test writing in the optimum power control (OPC) process. The OPC process is carried out by recording and reproducing prescribed test data on and from a power calibration area (PCA) in the recording medium.

To be more precise, test data of a prescribed pattern formed by marks and spaces with lengths of three times to fourteen times as long as the channel clock T (3T-14T) are recorded at several different levels of laser output power. Then, the test data are reproduced, and DC modulations of the RF signal and RF signal asymmetry after DC coupling are calculated as evaluation parameters at each level of output power.

The modulation M is calculated using equation (1), which is expressed by the ratio of maximum peak-to-peak amplitude $I_{p-p}$ of the RF signal to the maximum level Imax of the RF signal.

$$M = I_{p-p}/I\max \qquad (1)$$

The asymmetry β after DC coupling is expressed by equation (2) using a positive peak level X1 and a negative peak level X2 of the RF signal after AC coupling.

$$\beta = (X1+X2)/(X1-X2) \qquad (2)$$

where X1+X2 denotes the difference between the positive and negative peaks of the RF signal after AC coupling, and X1−X2 denotes the peak-to-peak value of the RF signal after AC coupling.

The optimum recording power is determined based on the modulation M and/or the asymmetry β after AC coupling.

To conduct actual recording operations, it is necessary to calculate the differential efficiency of the laser diode (LD) in advance and determine the driving current for each power level. In general, pre-recording is implemented in the focus-off state prior to the recording operation, and the recording output power levels are sampled to calculate the differential efficiency.

Conventionally, it has been considered that the driving current vs. laser output power characteristic (I-L characteristic) of a laser is substantially linear. However, to be more exact, the I-L characteristic exhibits a slightly a non-linear property. In addition, when outputting a laser pulse, the I-L characteristic varies in a short period of time due to abrupt change from low power to high power. As a result, the peak level of each pulse declines, as illustrated in FIG. 4. The peak drop becomes conspicuous as the output power becomes high. This is because the laser heats up more rapidly when the output power becomes higher.

In general, the higher the recording speed, the shorter the recording pulse. Accordingly, the quantity of peak drop increases when the recording speed becomes slower, as illustrated in FIG. 5A and FIG. 5B. The peak drop B of a long-width pulse shown in FIG. 5B is greater than the peak drop A of a short-width pulse shown in FIG. 5A (B>A).

If the laser driving current is determined on the assumption that that the I-L characteristic is linear, with little regard to the non-linear characteristic of the laser diode, output power error will occur and the recording quality will be degraded.

Another problem caused in conventional optical disk recording/reproducing apparatuses due to variation in peak drop phenomenon is deviation from the optimum full-scale value of the digital-to-analog converter.

Some kinds of optically recording and reproducing apparatuses employ a laser power control system that uses a digital-to-analog converter (DAC) as the current source for driving the peak power of the laser diode (LD), while digitally controlling the peak level. In such type of apparatus, another digital-to-analog converter is used to set the maximum driving current for the former DAC.

The latter DAC is called a full-scale DAC. The full-scale DAC adjusts the quantity of the maximum current required to drive the laser so as to optimize the resolution of the former DAC (for driving the peak level).

If a large amount of laser driving current is not so required, the value of the full-scale DAC is set small to increase the resolution of the peak-level driving DAC. For determining the full-scale DAC value, the differential efficiency of the laser has to be estimated in advance to determine how much driving current is required with respect to the maximum output power required under the given recording condition.

However, if the laser diode (LD) has such a characteristic that the peak drop becomes conspicuous along with increase of laser output power, the differential efficiency of the laser diode fluctuates depending on the output power. With such fluctuation, the optimum full-scale DAC value cannot be determined, and therefore, the resolution of the peak-level driving DAC cannot be set to the optimum.

SUMMARY OF THE INVENTION

It is therefore an object of the present invention to overcome the above-described problem, and to provide a laser power control technique capable of controlling the laser output power precisely during the recording operation based on an accurate differential efficiency, taking into consideration the non-linear characteristic of a laser diode.

It is another object of the invention to provide a laser power control technique capable of controlling the laser output power more precisely by calculating differential efficiency accurately and setting the resolution of the laser driving DAC.

It is still another object of the invention to provide an apparatus for recording and reproducing data in and from an optical recording medium using a laser beam under improved laser power control.

To achieve the objects, in one aspect of the invention, a laser power control apparatus for controlling an output power level of a semiconductor laser used to record and reproduce data in and from a recording medium is provided. This laser power control apparatus comprises:

a controller configured to vary a peak output power level of the semiconductor laser in a stepwise manner, calculate a differential efficiency at each of the varied peak output power levels, and determine a laser driving current based on a relation between the differential efficiency and the peak output power level; and a laser driving unit configured to drive the semiconductor laser using the laser driving current determined by the controller.

With this laser control apparatus, the output power level of the laser can be controlled accurately in the recording operation, taking into the non-linearity of the driving current vs. output power characteristic of the laser.

In another aspect of the invention, a laser power control apparatus for controlling an output power level of a semiconductor laser used to record and reproduce data in and from a recording medium comprises:

a controller configured to cause the semiconductor laser to output the laser beam with different irradiation waveforms corresponding to different recording speeds, calculate a differential efficiency for each of the recording speeds, and determine a laser driving current based on a relation between the differential efficiency and the recording speed; and a laser driving unit configured to drive the semiconductor laser using the laser driving current determined by the controller.

With this laser power control apparatuses, the output power level of the laser can be controlled further accurately depending on the waveform of the output pulse (or the recording speed).

In still another aspect of the invention, an apparatus for recording and reproducing data in and from a recording medium is provided. The apparatus comprises:

a semiconductor laser configured to emit a laser beam at two or more levels of output power;

an optical system configured to guide the laser beam onto the recording medium;

a controller configured to vary a peak output power level of the semiconductor laser in a stepwise manner to calculate a differential efficiency at each of the varied peak output power levels prior to a recording operation and determine a laser driving current suitable for a target recording power level based on a relation between the differential efficiency and the peak output power level; and a-laser driving unit configured to drive the semiconductor laser using the laser driving current determined by the controller.

In yet another aspect of the invention, an apparatus for recording and reproducing data in and from a recording medium comprises:

a semiconductor laser configured to emit a laser beam at two or more levels of output power;

an optical system configured to guide the laser beam onto the recording medium;

a controller configured to cause the semiconductor laser to output the laser beam with different irradiation waveforms corresponding to different recording speeds to calculate a differential efficiency for each of the recording speeds prior to a recording operation and determine a laser driving current suitable to a target recording power level based on a relation between the differential efficiency and the recording speed; and a laser driving unit configured to drive the semiconductor laser using the laser driving current determined by the controller.

In yet another aspect of the invention, a laser power control apparatus for controlling an output power level of a semiconductor laser used to record and reproduce data in and from a recording medium comprises:

a laser driving unit configured to drive the semiconductor laser; and a controller configured to vary a peak output power level of the semiconductor laser in a stepwise manner to calculate a differential efficiency at each of the varied peak output power levels prior to a recording operation, and determine a maximum driving current for the laser driving unit based on a relation between the differential efficiency and the peak output power level.

With this laser power control apparatus, the output power level of the laser can be controlled accurately by determining the maximum driving current for the laser driving unit.

In yet another aspect of the invention, an apparatus for recording and reproducing data in and from a recording medium is provided. This apparatus comprises:

a semiconductor laser configured to emit a laser beam at two or more levels of output power;

an optical system configured to guide the laser beam onto the recording medium;

a controller configured to vary a peak output power level of the semiconductor laser in a stepwise manner to calculate a differential efficiency at each of the varied peak output power levels prior to a recording operation and determine a maximum driving, current required to drive the semiconductor laser at a target recording power, based on a relation between the differential efficiency and the peak output power level; and a laser driving unit configured to drive the semiconductor laser using the maximum driving current determined by the controller.

BRIEF DESCRIPTION OF THE DRAWINGS

Other objects, features, and advantages of the present invention will become more apparent from the following detailed description when read in conjunction with the accompanying drawings, in which:

FIG. 10A through FIG. 10C show LD driving timing according to the first embodiment of the invention;

DETAILED DESCRIPTION OF THE INVENTION

The preferred embodiments of the present invention are described below with reference to the attached drawings.

Figure 6:
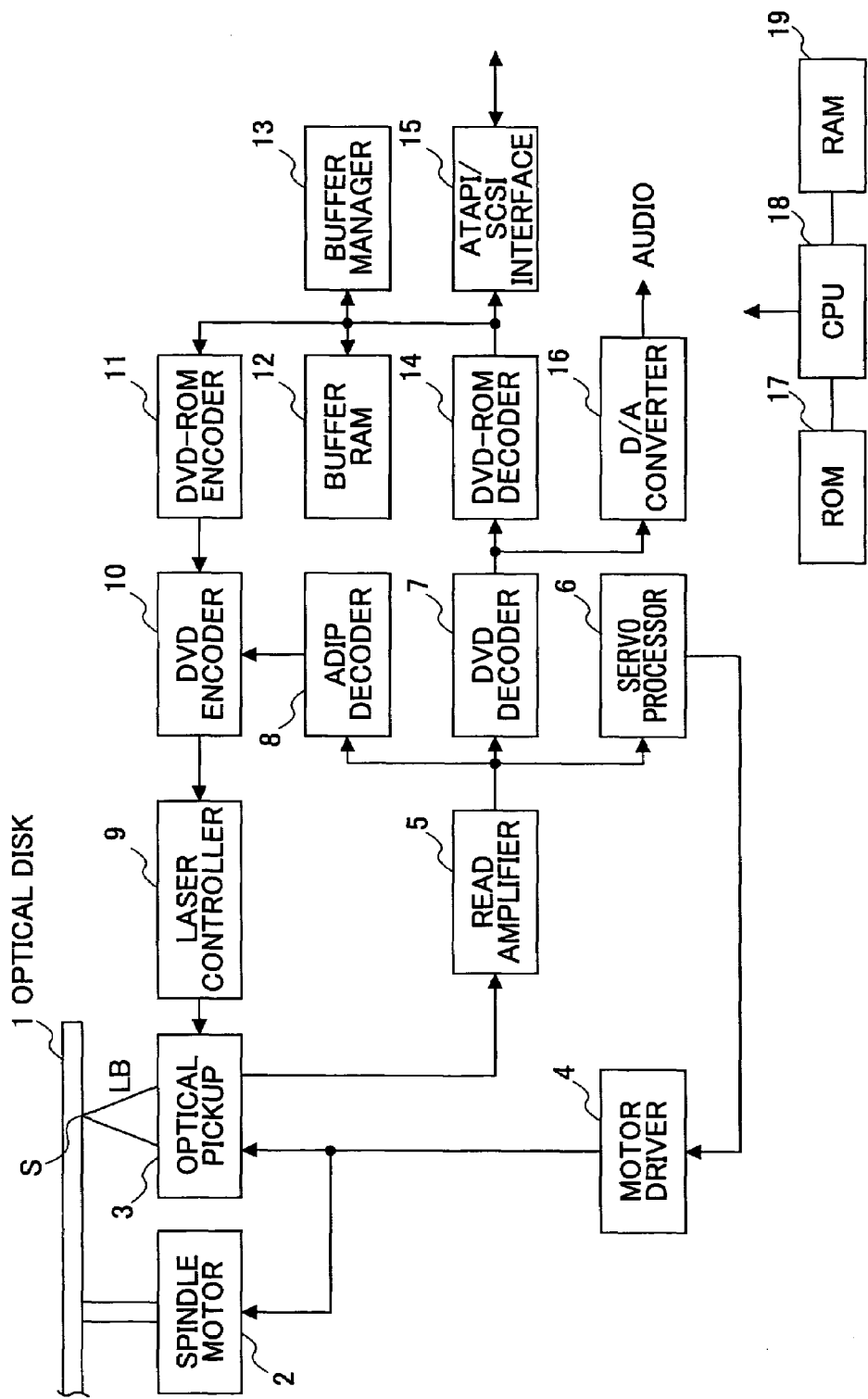
FIG. 6 is a block diagram showing the major part of a data recording and reproducing apparatus to which the present invention is applied.

FIG. 6 is a block diagram of an apparatus for optically recording and reproducing data in and from a recording medium (hereinafter, simply referred to as an "optical disk apparatus"), to which the present invention is applied. In the preferred embodiments, DVD-ROM formatted code data are recorded in a dye-type recording medium through eight to sixteen (8 to 16) modulation, by implementing mark edge/pulse width recording. A semiconductor laser diode (LD) is driven so as to output multiplse irradiation to form recording marks in the recording medium in accordance with the DVD-ROM formatted code data.

The optical disk apparatus includes a spindle motor 2 for rotating an optical disk 1, an optical pickup 3, a motor driver 4, a read amplifier 5, a servo processor 6, a DVD decoder 7, an ADIP decoder 8, a laser controller 9, a DVD encoder 10, a DVD-ROM encoder 11, a buffer RAM 12, a buffer manager 13, a DVD-ROM decoder 14, an ATAPI/SCSI interface 15, a digital-to-analog converter (DAC) 16, a ROM 17, a CPU 18, and a RAM 19. LB denotes laser beam, which is emitted from the optical pickup 3 toward the optical disk 1, and audio signals are output from the digital-to-analog converter 16.

The arrows connected between blocks indicate data flow. To simplify the figure, connection between each block and the CPU 18 that controls the operation of the block is omitted. Control programs described by codes readable by the CPU 18 are stored in the ROM 17. When the optical disk apparatus is turned on, the control programs are loaded in the main memory (not shown), and the CPU 18 controls the operation of each component (block) according to the control programs, while temporarily saving data required for control coordination in the RAM 19.

A more detailed explanation is made next on the structure and the operation of the optical disk apparatus shown in FIG. 6. The optical disk 1 is rotated by the spindle motor 2. The spindle motor 2 is controlled by the motor driver 4 and the servo processor 6 such that the linear velocity or the angular velocity becomes constant. The linear velocity or the angular velocity can be varied in a stepwise manner.

The optical pickup 3 guides the laser beam LB emitted from the semiconductor laser onto the optical disk 1 so as to form a light spot S on the recording layer. The optical pickup 3 is movable by means of a seek motor (not shown) along the sledge. The seek motor, together with the focus actuator and the track actuator provided in the optical pickup 3, bring the light spot S of the laser beam LB to a target position, via the motor driver 4 and the servo processor 6, based on the signal acquired from the light-receiving element and the position sensor.

When reading data from the optical disk 1, reproducing signals acquired by the optical pickup 3 are amplified and binarized by the read amplifier 5, and then supplied to the DVD decoder 7. The binary data, which have been encoded through eight-to-sixteen modulation converting eight-bit data to sixteen-bit data, are demodulated by the DVD decoder 7. A binding bit is added to the modulated code such that the number of "1"s and the number of "0"s become equal to each other on average. This is called "suppression of DC component ", and the slice level fluctuation of the DC-cut reproducing signal is suppressed.

The demodulated data are then subjected to deinterleaving and error correction, and supplied to the DVD-ROM decoder 14, in which further error correction is implemented to improve the reliability of data. The data, which have been subjected to error correction twice, are temporarily saved in the buffer RAM 12 by the buffer manager 13. When the data are accumulated sufficient to define sector data, the data are transferred to the host computer (not shown) at a time via the ATAPI/SCSI interface 15. If the reproduced data are audio (music) data, the data output from the DVD decoder 7 are supplied to the digital-to-analog converter (D/A converter) 16, and analog audio signal "Audio " is output.

When writing data, the data supplied from the host computer via the ATAPI/SCSI interface 15 are temporarily saved in the buffer RAM 12 by the buffer manager 13. Before the writing operation is started, the laser spot has to be positioned at a writing start position. For DVD+RW media or DVD+R media, the writing start position is determined by the wobble signal reproduced from the wobbling groove of the track, which is marked in advance on the optical disk 1. For DVD-RW and DVD-R media, the writing start position is determined from the land prepit area, instead of the wobble signal. For DVD-RAM media and DVD-RAM•WO media, the writing start position is determined from the prepit area.

The wobble signal reproduced from DVD+RW or DVD+R disks contains address information called an "Address in Pregroove (ADIP)", which is extracted by the ADIP decoder 8. The sync signal produced by the ADIP decoder 8 is supplied to the DVD encoder 10 to allow data to be written in an accurate position on the optical disk 1. The data saved in the buffer RAM 12 are supplied to the DVD-ROM encoder 11 or DVD encoder 10, which adds an error correction code to or implements interleaving of the data. Then, the data are written in the optical disk 1 by the laser controller 9 and the optical pickup 3.

The address information is also extracted from the land prepit area or prepit area.

Figure 7:
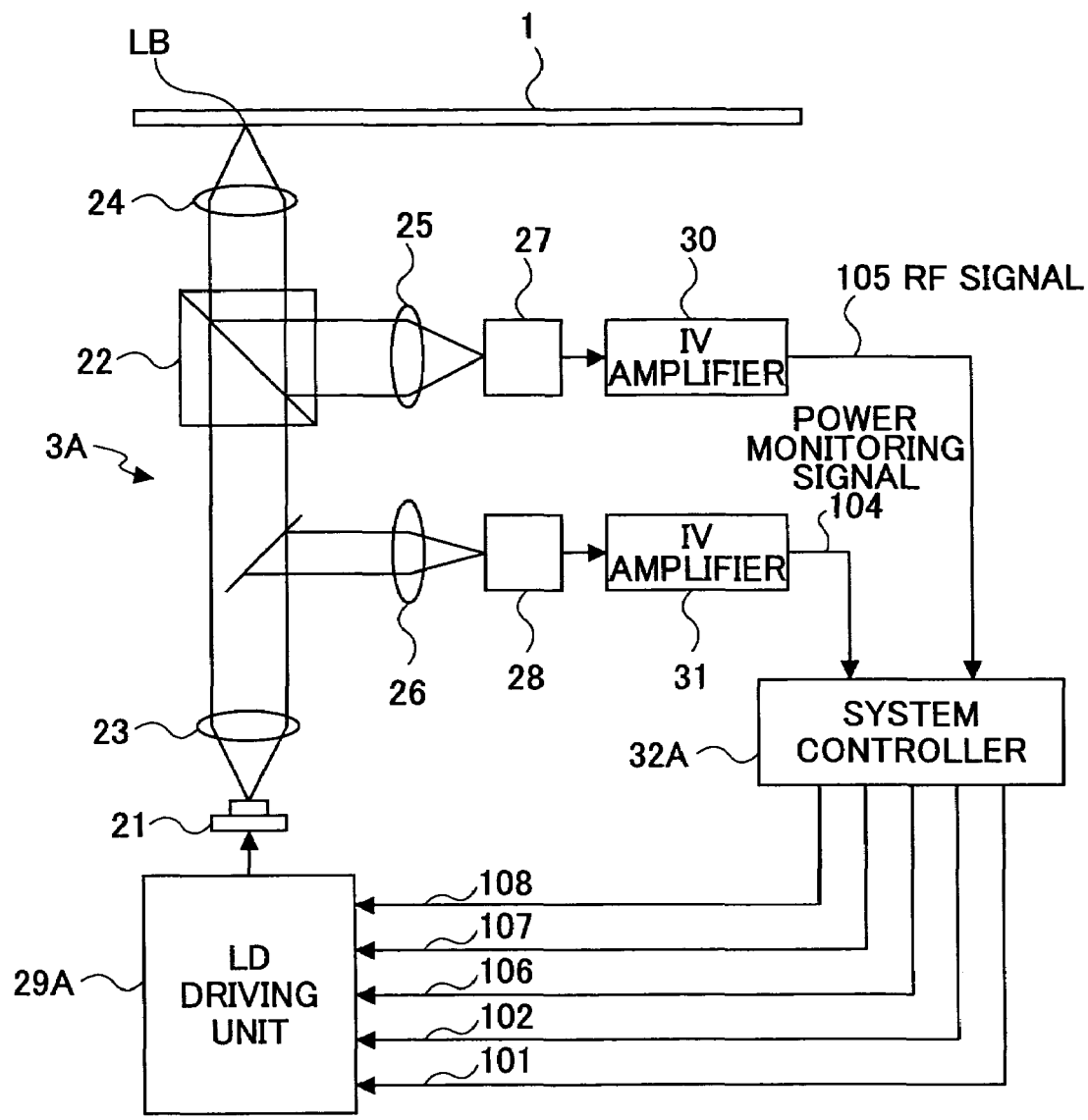
FIG. 7 is a schematic diagram showing the structure of the optical pickup according to the first embodiment of the invention.

FIG. 7 is a schematic diagram illustrating the optical pickup 3A according to the first embodiment of the invention. The optical pickup 3A includes an optical system including a laser diode (LD) 21 functioning as the light source, a beam splitter 22, a set of lenses 23-26, and a pair of light-receiving elements 27 and 28. The laser diode 21 is driven by the LD driving unit 29A. The optical pickup 3A also includes current-to-voltage converter amplifiers (I/V amplifiers) 30 and 31, and a system controller 32A. The system controller 32A supplies bias-level current driving signal 101, peak-level current superposing signal 102, power sampling timing signal 106, pulse control signal 107, and write gate signal 108 to the LD driving unit 29A.

Figure 8:
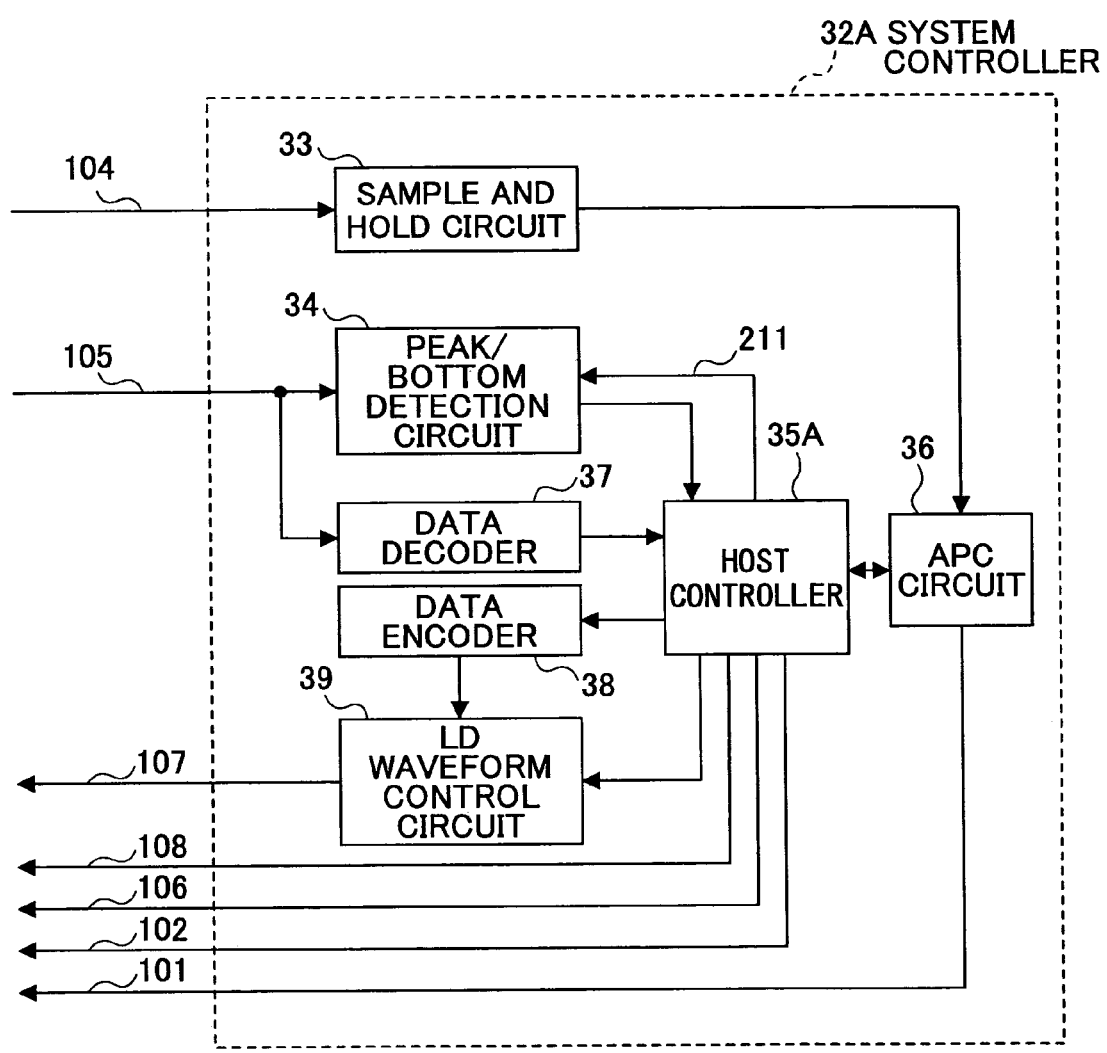
FIG. 8 is a block diagram of the system controller used in the optical pickup shown in FIG. 7.

FIG. 8 is a block diagram of the system controller 32A used in the optical pickup 3A. The system controller 32A includes a sample-and-hold circuit 33, a peak and bottom detection circuit 34, a host controller 35A, an APC circuit 36, a data decoder 37, a data decoder 38, and an LD waveform control circuit 39.

Figure 9:
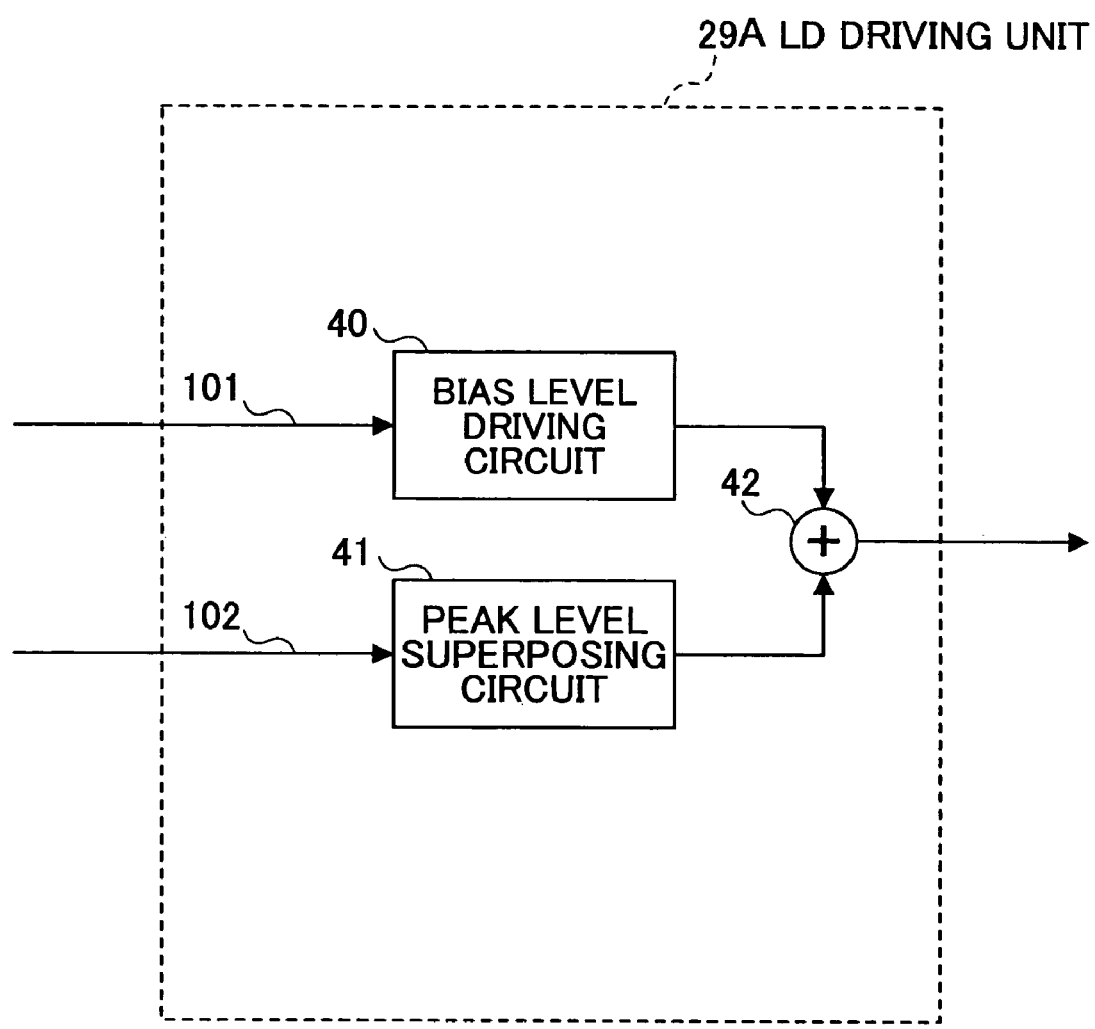
FIG. 9 is a block diagram of the LD driving unit used in the optical pickup shown in FIG. 7.

FIG. 9 is a block diagram of the LD driving unit 29A shown in FIG. 7. The LD driving unit 29A has a bias level driving circuit 40, a peak level superposing circuit 41, and an adder 42.

In playback, the LD driving unit 29A drives the laser diode (LD) 21 so as to output a laser beam at a reproducing power (or reading power). The laser beam at a reproducing power is guided by the optical system of the optical pickup 3 onto the optical disk 1. The light-receiving element 27 receives a return beam reflected from the optical disk 1 and converts the light quantity into an electric current signal. The electric current is converted to a voltage and amplified by the I/V amplifier 30. This IV-converted signal is output as the RF signal 105.

A portion of the laser beam emitted from the LD 21 is guided to the monitoring light-receiving element 28, and a monitoring current detected in proportion to the output power is converted to a voltage and amplified by the I/V amplifier 31, which is then output as the power monitoring signal 104.

The APC circuit 36 (FIG. 8) in the system controller 32A receives the power monitoring signal 104, and outputs a bias-level current driving signal 101 to the LD driving unit 29A. (It should be noted that the sample and hold circuit 33 is always in the sampling mode in the playback mode.) The APC circuit 36 is structured by an inverting amplifier, and accordingly, a feedback loop is formed by the APC circuit 36, the LD driving unit 29A, and I/V amplifier 31 in order to implements automatic power control (APC) for keeping the reproducing power constant.

In general, to record data in a dye-type recording medium, two different levels of recording power, namely, peak level and space level (bias level) are required. In this example, the bottom level of the multipulse irradiation for forming a mark is at the same level as the bias level. However, the bottom level may be set separately from the bias level.

In the recording mode, the host controller 35A generates a pulse control signal 107 based on the input data (consisting of eight-to-sixteen modulated data) and supplies the pulse control signal 107 to the LD driving unit 29A, as shown in FIG. 7. The LD driving unit 29A drives the laser diode (LD) 21 by a driving current according to the pulse control signal 107 to cause the laser diode 21 to output multipulse irradiation shown in FIG. 1 (indicated by symbol (c)) The laser beam emitted from the laser diode 21 is guided onto the optical disk 1 to form recording marks on the recording layer.

The host controller 35A supplies bias-level current driving signal 101 and peak-level current superposing signal 102 to the LD driving unit 29A in order to control the space level and the peak level of the laser output power.

In the LD driving unit 29A, the bias level driving circuit 40 (FIG. 9) generates a bias current according to the bias-level current driving signal 101. The peak level superposing circuit 41 generates an electric current according to the peak-level current superposing signal 102, which is added to the bias current by the adder 42. The superposed driving signal is supplied to the laser diode 21. In this example, the peak level superposing circuit 41 is a digital-to-analog converter (first DAC), which converts the peak-level current superposing signal 102 supplied in a digital form from the host controller 35A to an analog form (electric current).

The host controller 35A outputs a power sampling timing signal 106 when long space data (for example, space data of 10T or longer) are output. The sample and hold circuit 33 samples and holds the power monitoring signal 104 at the falling edge (changing from H to L) of the power sampling timing signal 106, as illustrated in FIG. 10C, in order to execute bias level power control.

The peak output power level of the laser diode 21 is regulated by superposing an electric current calculated from the differential efficiency of the laser output power to the bias level driving current and by supplying the resultant driving signal to the laser diode (LD) 21.

The laser diode 21 is driven to implement dummy writing in period A shown in FIG. 10A, prior to (or immediately before) the actual recording operation, and the differential efficiency of the laser beam is calculated based on the peak level sampled in the dummy writing period A. During the dummy writing, the system is set in the defocusing state so as not to record data in the recording medium.

Figure 1:
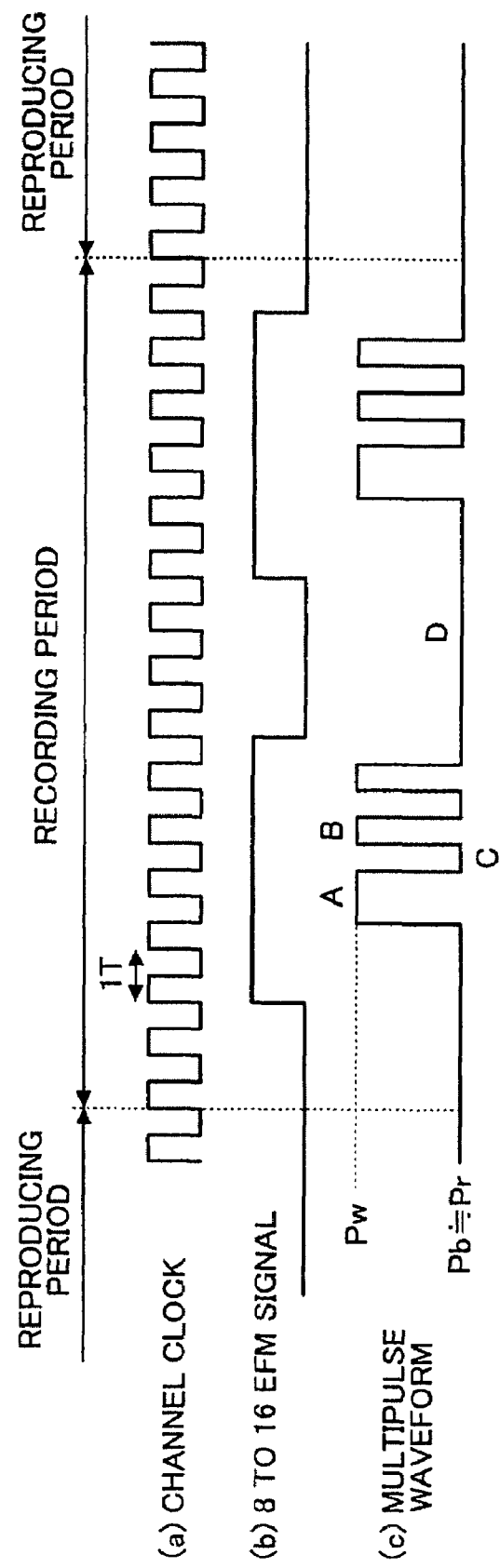
FIG. 1 is a timing chart showing an example of a multipulse waveform of a laser beam used to record data in a dye-type recording medium.
Figure 2:
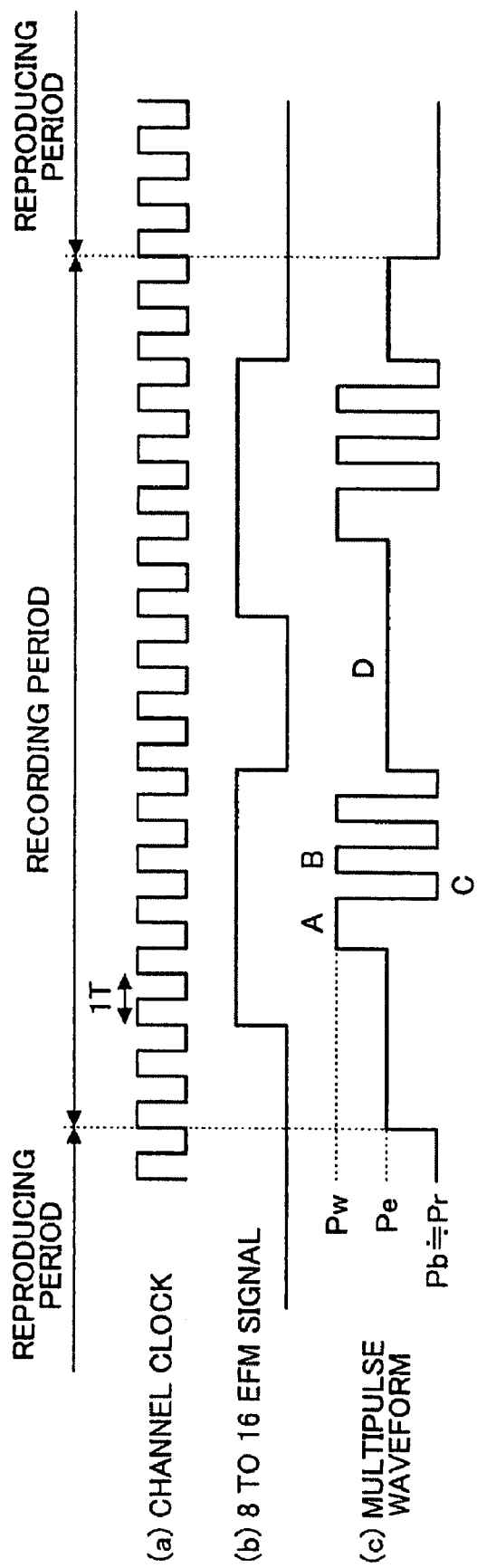
FIG. 2 is a timing chart showing an example of a multipulse waveform of a laser beam used to record data in a phase-change recording medium.
Figure 3:
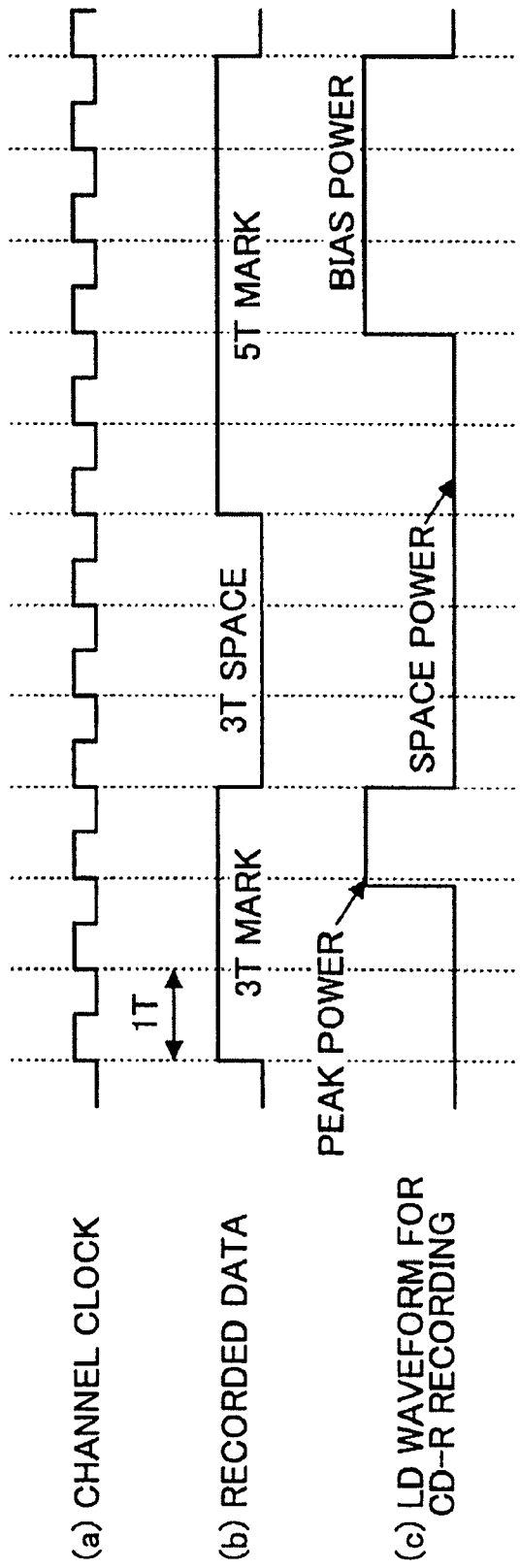
FIG. 3 is a timing chart showing an example of a recording strategy employed when recording data in a CD-R (dye-type) recording medium.
Figure 4:
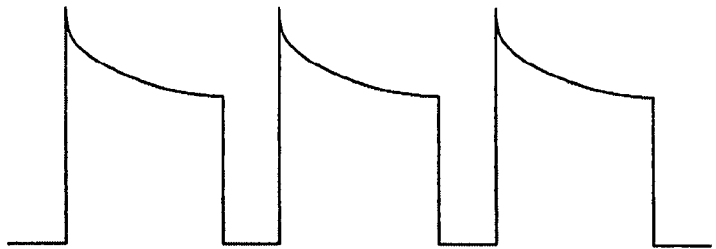
FIG. 4 is a diagram showing peak drop in a laser output pulse.
Figure 5A:
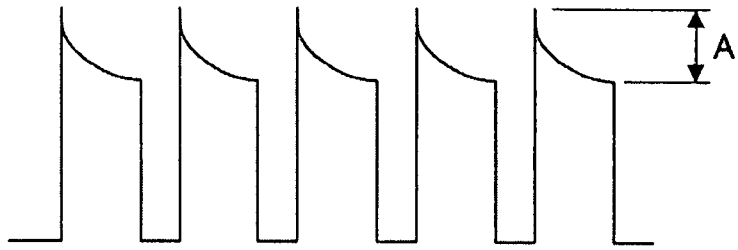
FIG. 5A and FIG. 5B are pulse shapes showing the relation between recording speed and peak drop.
Figure 5B:
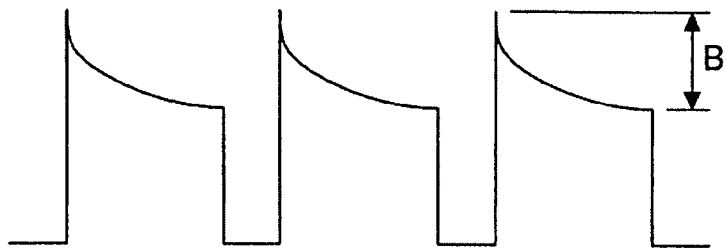

In the ordinary writing operation, multipulse irradiation is conducted between the peak power level and the bottom power level to record the data based on the waveform indicated by symbol (c) in FIG. 1. It is not practical to sample the peak level during irradiation with such a waveform. Accordingly, in the dummy writing period A, the peak level is maintained for a certain period of time (non-pulse peak period) to allow the peak level to be sampled for calculation of the differential efficiency, as illustrated in FIG. 10B. The non-pulse peak period is inserted at the timing of occurrence of long mark data (longer than or equal to 10T, for example).

In the ordinary writing operation, the power sampling timing signal 106 becomes H-level when long space data come up. To the contrary, during the dummy irradiation for calculation of the differential efficiency, the power sampling timing signal 106 rises to them level when long mark data come out, at which timing non-pulse irradiation is conducted to allow the peak level to be sampled. Based on the two sampling levels, that is, the peak level sampled at the occurrence of long mark data and the bias level sampled at the occurrence of long space data as illustrated in FIG. 10B, the differential efficiency of laser output is calculated.

Figure 11:
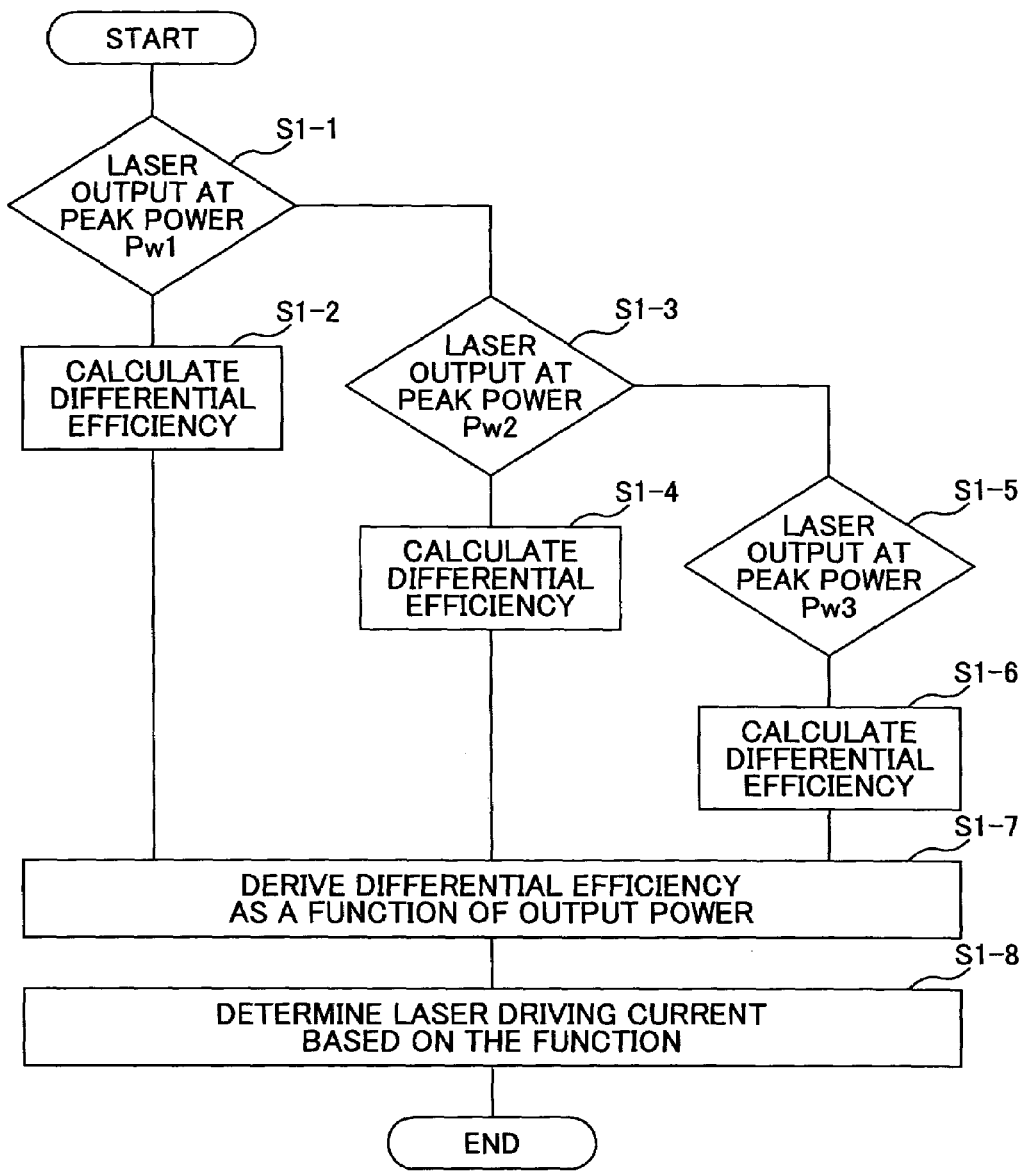
FIG. 11 is a flowchart of calculation of the differential efficiency and determination of peak level driving current according to the first embodiment of the invention.

FIG. 11 is a flowchart showing calculation of differential efficiencies at different peak power levels and determination of the laser driving current according to the first embodiment of the invention.

Figure 12:
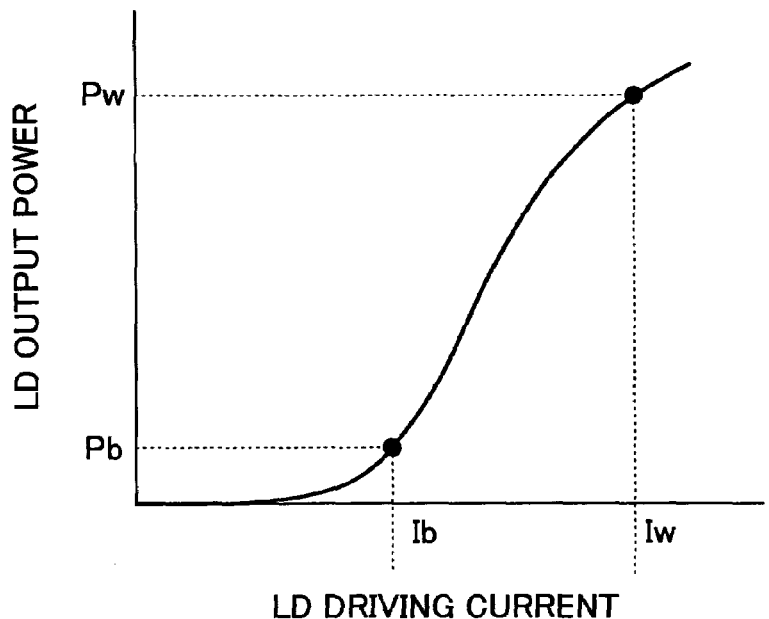
FIG. 12 is a graph of LD output power as a function of LD driving current, showing the non-linear I-L characteristic.
Figure 13:
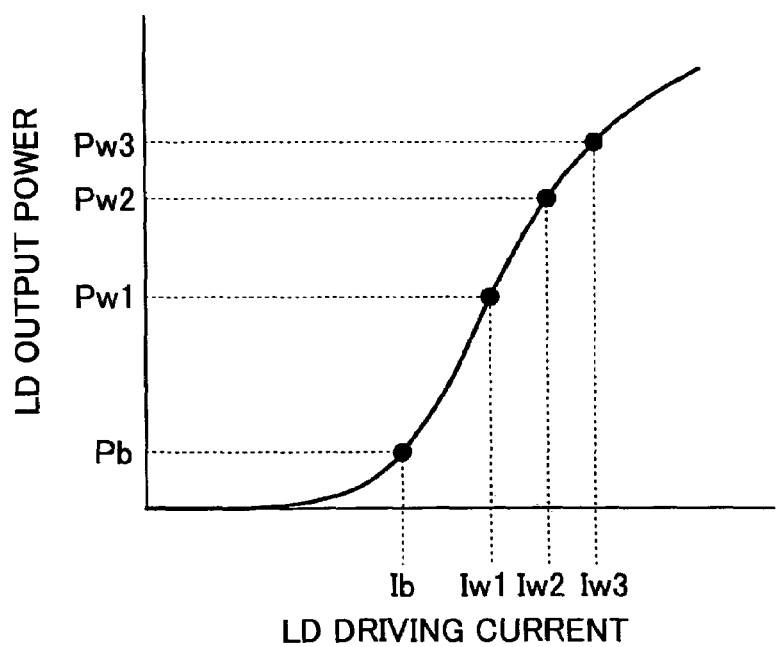
FIG. 13 is a graph used to explain stepwise change of the peak level output power to calculate differential efficiencies at different peak levels taking the non-linear I-L characteristic into account according to the first embodiment of the invention.

First, the peak output power level is set to several levels (Pw1 in S1-1, Pw2 in S1-3, and Pw3 in S1-5), and dummy writing is carried out at the respective levels to calculate the corresponding differential efficiencies (S1-2, S1-4, and S1-6). As illustrated in FIG. 12 and FIG. 13, the relation between the peak output power level of the laser diode 21 and the LD driving current is non-linear. Accordingly, the optimum LD driving current is determined taking the non-linear characteristic into account according to the preferred embodiments.

The differential efficiency η (Pw) at each output power is estimated from equation (3).

$$\eta(Pw) = (Pw - Pb)/\Delta Iw = (Pw - Pb)/(Iw - Ib) \quad (3)$$

where Ib denotes the bias level driving current, Pb denotes the bias output power level, Iw denotes the peak level driving current, Pw denotes the peak output power level, and ΔIw denotes the peak level superposing current representing the difference between Iw and Ib.

Then, an approximate expression defining the relation between output power Pw and differential efficiency η is derived from the differential efficiencies and the associated peak power levels (S1-7 of FIG. 11). The expression may be a linear expression; however, quadratic expression (4) is preferably employed in this embodiment for a more accurate definition of the function.

$$\eta(Pw) = a*Pw^2 + b*Pw + c \quad (4)$$

If no test writing is carried out, the differential efficiency η (Pw) is determined by substituting a peak power Pw used in the actual recording operation in formula (4). Then, the peak level superposing current ΔIw is calculated from equation (5) (S1-8), which current is extracted as the peak-level current superposing signal 102.

$$\Delta Iw(Pw) = Pw/\eta(Pw) \quad (5)$$

If test writing is carried out in the test writing period B as shown in FIG. 10A, the host controller 35A generates a sector sync signal 211 (see FIG. 8) every time the sector is switched in the test writing period. In writing test data, the write gate signal 108 is at a High level. For example, when DVD-formatted eight-to-sixteen modulation codes are employed, sector sync signal 211 is generated every 38,688 channel clocks (1,488*26=38,688). Every time the sector sync signal 211 is generated, the peak-level current superposing signal 102 is updated to change the peak output power level of the laser diode in a stepwise manner, as indicated by period B in FIG. 10A.

At each peak output power level, the differential efficiency η and the associated peak-level current superposing signal 102 are calculated using equations (4) and (5).

When test writing with the output power varied stepwise is finished, the recorded data are reproduced, and RF signal 105 is sampled at each sector and asymmetry β is calculated for each sector using equation (2). Based on the calculated asymmetry β, the output power of the laser diode (LD) 21 is determined for the actual recording operation. The β value that represents the highest recording quality has been estimated in advance depending on the type of the recording medium (disk).

Figure 14:
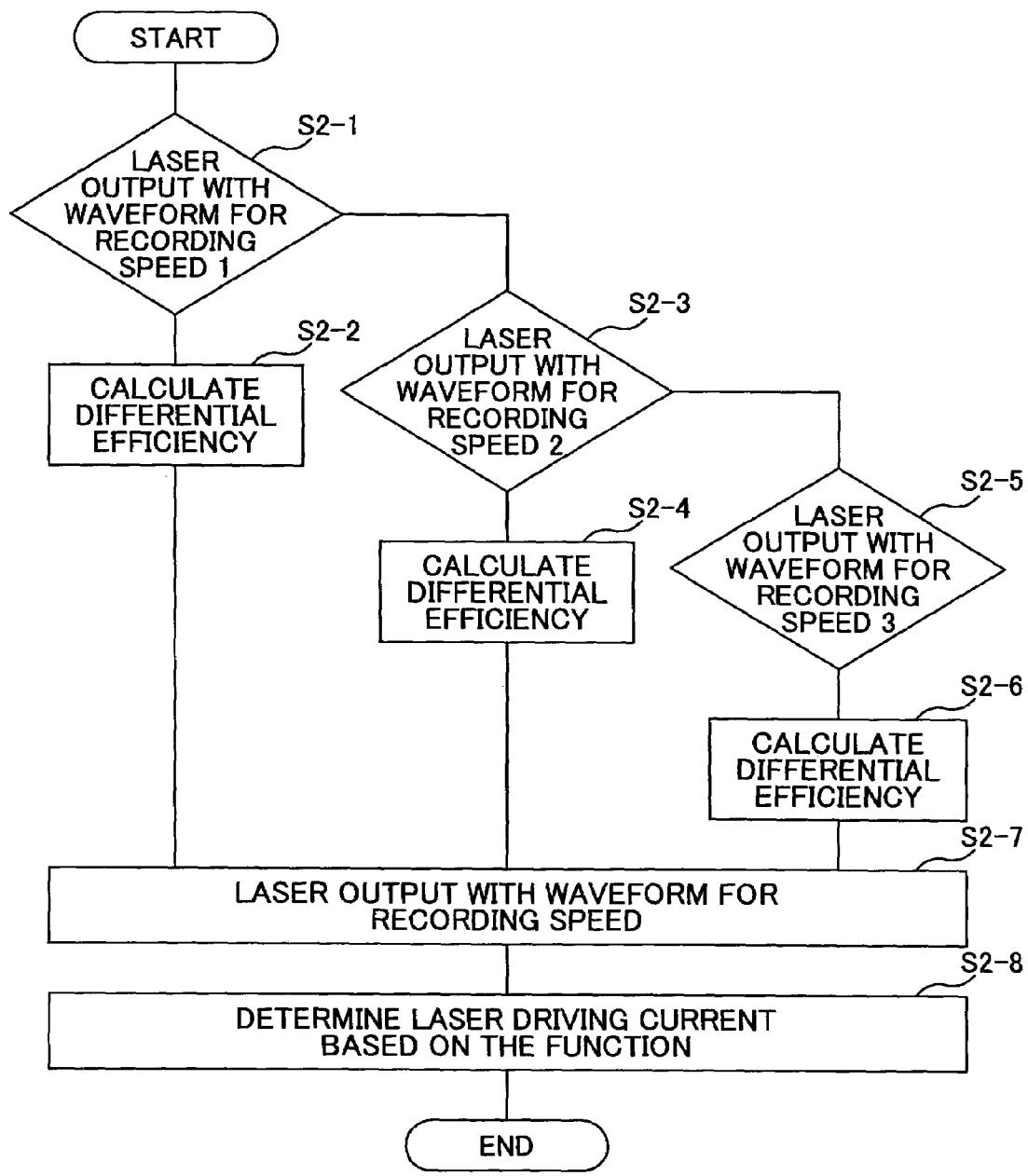
FIG. 14 is a flowchart of calculation of differential efficiency at different recording speeds according to another example of the first embodiment of the invention.
Figure 15:
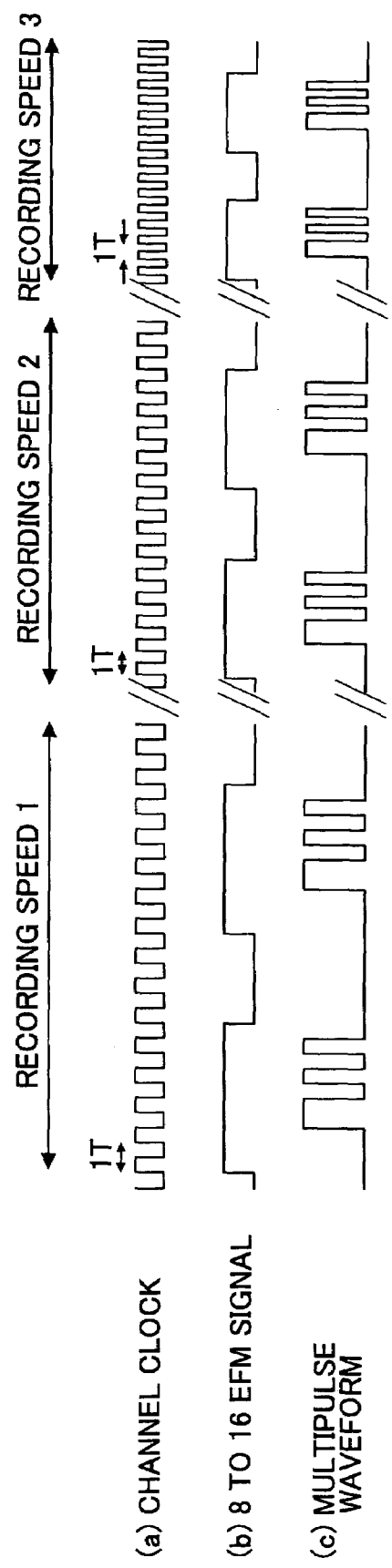
FIG. 15 shows LD driving timing at different recording speeds.

FIG. 14 and FIG. 15 illustrate a modification of the calculation of the differential efficiency according to the first embodiment of the invention. In the modification, differential efficiencies are calculated at different recording speeds.

FIG. 14 is a flowchart of calculation of differential efficiency and determination of laser driving current, and FIG. 15 is a timing chart showing channel clocks (a) for different recording speeds and the multipulse waveform of the laser diode. An appropriate correction is made on differential efficiency η depending on the recording speed. Other portions are the same as those explained in the first embodiment.

During the dummy writing period, which is carried out prior to (or immediately before) the recording operation in order to calculate differential efficiency, the recording speed is varied to several levels. In this example, multipulse irradiation is conducted with waveforms for three different recording speeds (S2-1, S2-3, and S2-5). The recording speed is increased from recording speed 1, to recording speed 2, and to recording speed 3, as shown in FIG. 15. At each recording speed, the differential efficiency is calculated using equation (3) (S2-2, S2-4, and S2-6).

Then, an approximate expression defining the relation between recording speed (linear velocity) Vl and differential efficiency η is derived from the differential efficiencies and the associated recording speeds (S2-7). The expression is quadratic expression (6), as in the first embodiment.

$$\eta(Vl)=a*Vl^2+b*Vl+c \quad (6)$$

If no test writing is carried out, the differential efficiency η (Vl) is determined by substituting a recording speed V1 used in-the actual recording-operation in formula (6). Then, the peak level superposing current ΔIw is calculated from equation (7) (S2-8), which current is extracted as the peak-level current superposing signal 102.

$$\Delta Iw(Vl)=Pw/\eta(Vl) \quad (7)$$

If test writing is carried out in the second embodiment, the host controller 35 executes the same sequence as in the first embodiment, in this case, at each peak level test At each peak output power level, the differential efficiency η and the associated peak-level current superposing signal 102 are calculated using equations (6) and (7).

Figure 16:
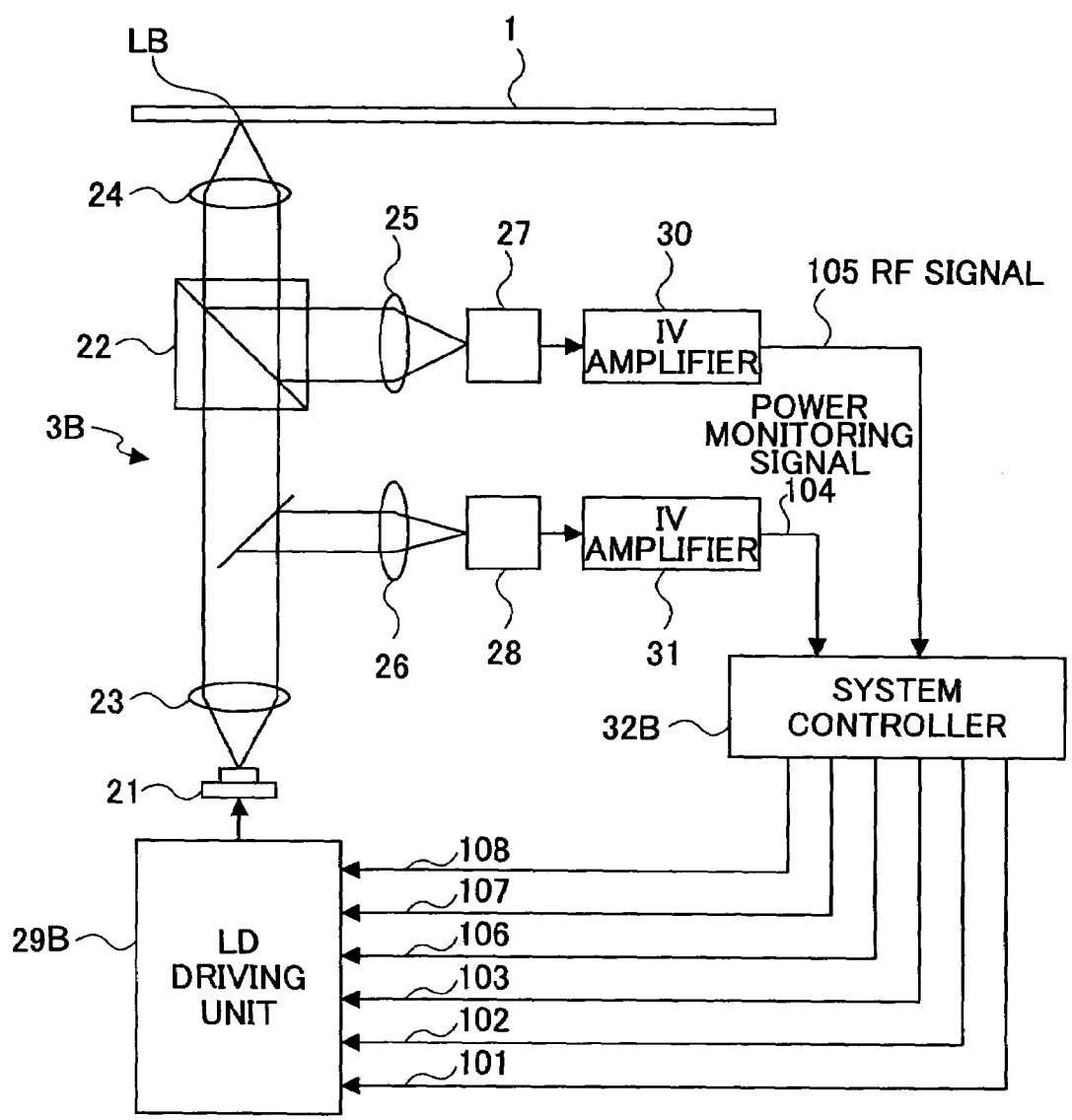
FIG. 16 is a block diagram of the optical pickup according to the second embodiment of the invention.
Figure 17:
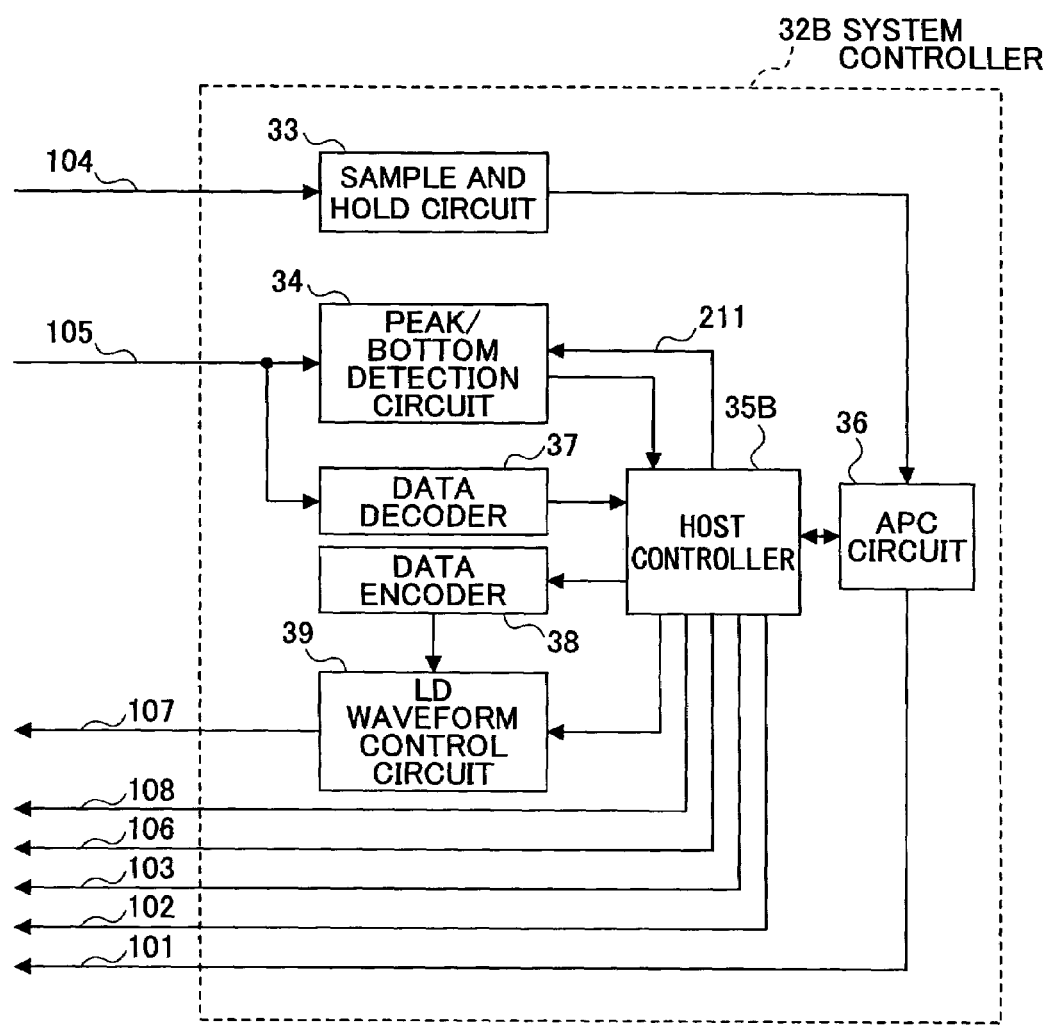
FIG. 17 is a block diagram of the system controller used in the optical pickup shown in FIG. 16.

Next, the second embodiment of the invention is explained with reference to FIG. 16 through FIG. 20. FIG. 16 is a block diagram of the optical pickup 3B according to the second embodiment, and FIG. 17 is a block diagram of the system controller 32B used in the optical pickup 3B. The host computer 35B of the system controller 32B generates and supplies a full-scale setting signal 103, in addition to bias-level current driving signal 101, peak-level current superposing signal 102, power sampling timing signal 106, pulse control signal 107, and write gate signal 108, to the LD driving unit 29B.

Figure 18:
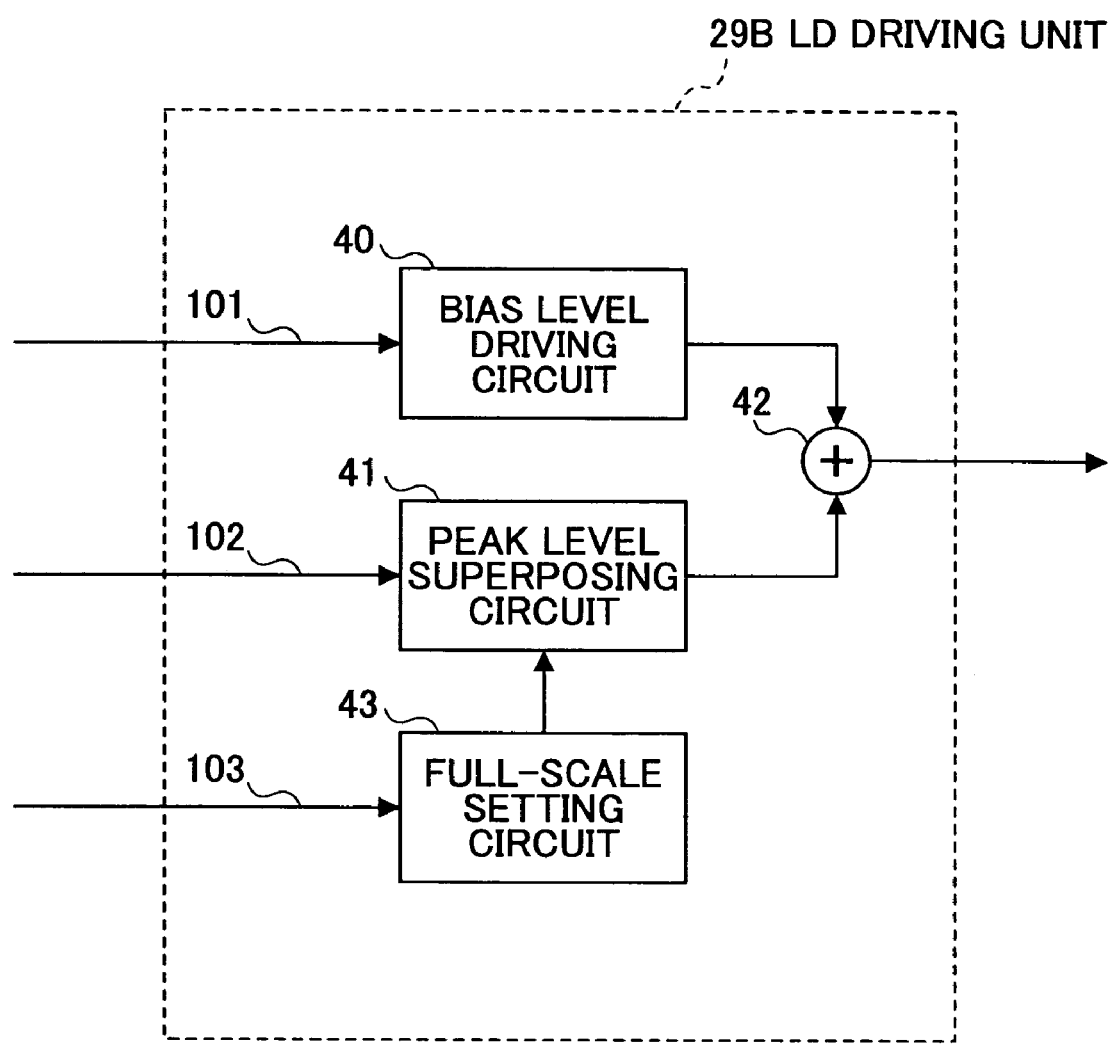
FIG. 18 is a block diagram of the LD driving unit used in the optical pickup shown in FIG. 16.

FIG. 18 is a block diagram of the LD driving unit 29B, which includes a bias level driving circuit 40, a peak level superposing circuit 41, and a full-scale setting circuit 43. The bias level driving circuit 40 generates bias current according to the bias-level current driving signal 101 supplied from the system controller 32B. The peak level superposing circuit 41 generates electric current corresponding to the peak-level current superposing signal 102, which current is superposed on the bias current through the adder 42. The peak-level superposing circuit 41 is formed by a digital-to-analog converter referred to as the first DAC.

The full-scale setting circuit 43 is also formed by a digital-to-analog converter (referred to as the second DAC) and it determines the full-scale of the peak level superposing circuit (the first DAC) 41 based on the full-scale setting signal supplied from the host controller 35B of the system controller 32B.

Figure 19:
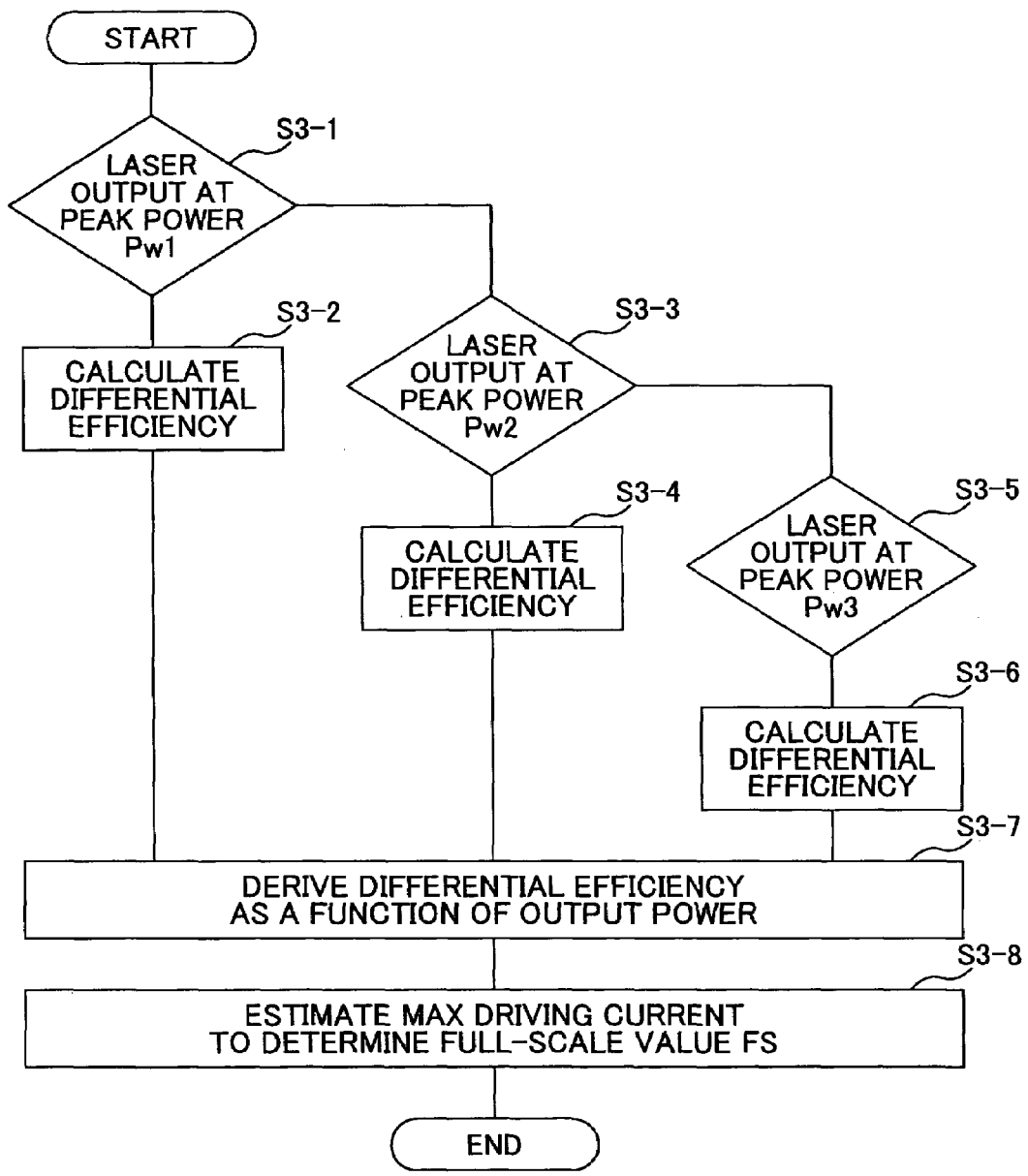
FIG. 19 is a flowchart of calculation of differential efficiency and determination of full-scale setting value according to the second embodiment of the invention.

FIG. 19 is a flowchart showing the operation of calculation of differential efficiency and determination of full-scale setting value, which is executed by the host controller 35B.

First, the peak output power level is set to several levels (Pw1 in S3-1, Pw2 in S3-3, and Pw3 in S3-5), and dummy writing is carried out at the respective levels to calculate the corresponding differential efficiencies (S3-2, S3-4, and S3-6). The differential efficiency η (Pw) at each output power level is estimated from equation (3).

$$\eta(Pw)=(Pw-Pb)/\Delta Iw=(Pw-Pb)/(Iw-Ib) \quad (3)$$

where Ib denotes the bias level driving current, Pb denotes the bias output power level, Iw denotes the peak level driving current, Pw denotes the peak output power level, and ΔIw denotes the peak level superposing current representing the difference between Iw and Ib.

Then, an approximate expression defining the relation between output power Pw and differential efficiency η is derived from the differential efficiencies and the associated peak power levels (S3-7). The approximate expression is quadratic expression (4).

$$\eta(Pw)=a*Pw^2+b*Pw+c \quad (4)$$

If no test writing is carried out, the differential efficiency η (Pw) is determined by substituting a peak power Pw used in the actual recording operation in formula (4). Then, the full-scale setting value is determined (S3-8) for the full-scale setting circuit 43 of the LD driving unit 29B. The full-scale setting value (FS) is determined by estimating the maximum driving current from the maximum power required under the current condition and the differential efficiency.

To be more precise, the Full-Scale setting value (FS) is determined from equations (8) and (9).

$$\Delta Iw(Pw\_max)=(Pw\_max-Pb)/\eta(Pw\_max) \quad (8)$$

$$FS=[\Delta Iw(Pw\_max)/\Delta Iw\_max]*255 \quad (9)$$

where Pw_max is the maximum output level, ΔIw(Pw_max) is the peak-level superposing current at the maximum output power, and ΔIw_max is the maximum driving current generated by the peak level superposing circuit 41. In equation (9), it is assumed that the full-scale setting value (RS) is represented by 8 bits. When ΔIw(Pw_max) is equal to ΔIw_max, the full-scale setting value (FS) becomes 255. This full-scale setting value is extracted as the full-scale setting signal 103 to be supplied to the LD driving circuit 29B.

Then, the peak-level superposing current ΔIw is calculated from equation (5), as in the first embodiment, which current is extracted as the peak-level current superposing signal 102.

$$\Delta Iw(Pw) = Pw/\eta(Pw) \qquad (5)$$

If test writing is carried out in the test writing period B (FIG. 10A), the host controller 35B generates a sector sync signal 211 (see FIG. 8) every time the sector is switched in the test writing period. In writing test data, the write gate signal 108 is at a High level. For example, when DVD-formatted eight-to-sixteen modulation codes are employed, sector sync signal 211 is generated every 38,688 channel clocks (1,488*26=38,688). Every time the sector sync signal 211 is generated, the peak-level current superposing signal 102 is updated to change the peak level output power of the laser diode in a stepwise manner, as indicated by period B in FIG. 10A.

At each peak output power level, the differential efficiency η and the associated peak-level current superposing signal 102 are calculated using equations (4) and (5).

When test writing with the output power varied stepwise is finished, the recorded data are reproduced, and RF signal 105 is sampled at each sector and asymmetry β is calculated for each sector using equation (2). Based on the calculated asymmetry β, the output power of the laser diode (LD) 21 is determined for the actual recording operation. The β value that represents the highest recording quality has been estimated in advance depending on the type of the recording medium (disk).

After the optimum power is set through test writing, actual recording operations are carried out. If the recording power (peak power level) changes greatly, the differential efficiency also changes, and therefore, the full-scale setting value changes. In the same recording medium, one of the conditions that causes the recording power to change is change in recording speed. In general, as the recording speed increases, the required recording power also increases.

Under the circumstances where data are recorded repeatedly, the differential efficiency and the full-scale setting value are newly calculated when the recording output power level changes from the output power level for the previously performed recording operation by a prescribed quantity or more, or when the recording speed is changed. With this arrangement, the full-scale setting value can be updated to the optimum value according to the circumstances.

Figure 20:
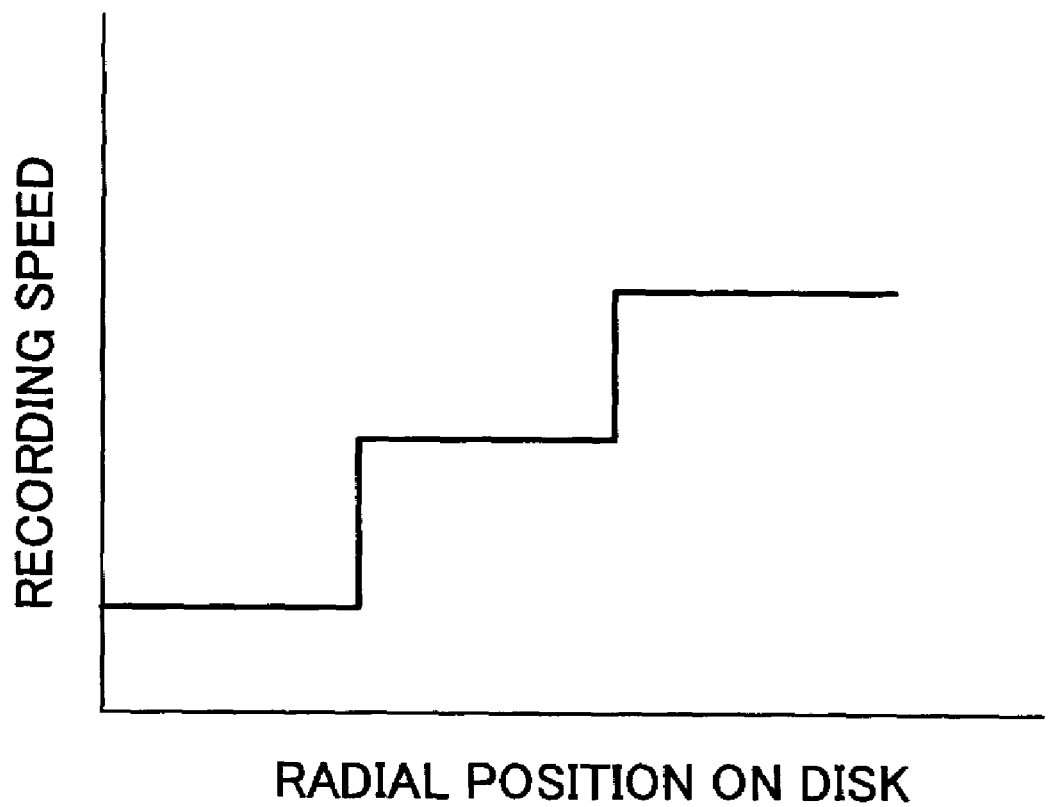
FIG. 20 is a graph for explaining rotational control of the spindle using zone constant linear velocity (ZCLV) for increasing the recording speed.

To further increase the recording speed, the rotation of the spindle motor 2 is controlled in the zone constant linear velocity mode, as illustrated in FIG. 20 during the recording operation. Under this rotational control, the recording speed is increased in a stepwise manner, as the recording position on the optical disk shifts to the outer periphery in the radial direction. This arrangement can prevent the revolution rate of the spindle motor 2 from increasing excessively when data are being recorded near the center portion of the disk.

When the recording position on the optical disk 1 reaches a prescribed position along the radius, a higher recording power level (peak output power level) is required in order to increase the recording speed. If the recording operation is carried out continuously in the ZCLV mode, a new differential efficiency and a new full-scale value are calculated upon change of the recording speed to update the full-scale value to the optimum.

As has been described above, the laser driving current can be set accurately based on the differential efficiencies at different peak power levels or different recording speeds. Consequently, the laser output power in the recording operation can be controlled precisely, taking the non-linear I-L characteristic into account. In addition, by determining the maximum driving current for the laser driving source, the laser output power in the recording operation can be controlled precisely.

As a result, the recording quality is improved.

This patent application is based on and claims the benefit of the earlier filing date of Japanese Patent Application Nos. 2003-138897 and 2003-138910, both filed May 16, 2003, the entire contents of which are hereby incorporated by reference.

The invention claimed is:

1. A laser power control apparatus for controlling an output power level of a semiconductor laser used to record and reproduce data in and from a recording medium, comprising:

a controller configured to vary a peak output power level of the semiconductor laser in a stepwise manner, calculate a differential efficiency at each of the varied peak output power levels, and determine a laser driving current based on a relation between the differential efficiency and the peak output power level; and a laser driving unit configured to drive the semiconductor laser using the laser driving current determined by the controller.

2. The laser power control apparatus of claim 1, wherein the controller is configured to derive a formula defining the differential efficiency as a function of peak output power level based on the calculated differential efficiencies.

3. The laser power control apparatus of claim 2, wherein the controller derives the formula prior to a recording operation carried out using the laser beam, and the controller is further configured to determine a laser driving current corresponding to a target recording power level for the recording operation based on the formula.

4. The laser power control apparatus of claim 2, wherein the controller derives the formula prior to test writing carried out for determining an optimum recording power level for a recording operation, and the controller is further configured to determines the laser driving current corresponding to the optimum recording power level based on the formula.

5. A laser power control method for controlling an output power level of a semiconductor laser used to record and reproduce data in and from a recording medium, comprising the steps of:

varying a peak output power level of the semiconductor laser in a stepwise manner;

calculating-a differential efficiency at each of the varied peak output power levels;

deriving a formula defining the differential efficiency as a function of peak output power level, based on the calculated differential efficiencies; and determining a laser driving current suitable for a target recording power level for a recording operation based on the formula.

6. An apparatus for recording and reproducing data in and from a recording medium, comprising:

a semiconductor laser configured to emit a laser beam at two or more levels of output power;

an optical system configured to guide the laser beam onto the recording medium;

a controller configured to vary a peak output power level of the semiconductor laser in a stepwise manner to calculate a differential efficiency at each of the varied peak output power levels prior to a recording operation and determine a laser driving current suitable for a target recording power level based on a relation between the differential efficiency and the peak output power level; and a laser driving unit configured to drive the semiconductor laser using the laser driving current determined by the controller.

7. A laser power control apparatus for controlling an output power level of a semiconductor laser used to record and reproduce data in and from a recording medium, comprising:

a laser driving unit configured to drive the semiconductor laser; and a controller configured to vary a peak output power level of the semiconductor laser in a stepwise manner to calculate a differential efficiency at each of the varied peak output power levels prior to a recording operation, and determine a maximum driving current for the laser driving unit based on a relation between the differential efficiency and the peak output power level.

8. The laser power control apparatus of claim 7, wherein the controller determines the maximum driving current from a target output power level required for the recording operation and a target differential efficiency corresponding to the target power level.

9. The laser power control apparatus of claim 7, wherein the laser driving unit includes two or more laser driving current sources, at least one of the laser driving current sources being structured by a digital-to-analog converter, and the controller calculates a full-scale setting value from the maximum driving current and supplies the full-scale setting value in a digital form to the digital-to-analog converter.

10. The laser power control apparatus of claim 7, wherein the controller recalculates a new differential efficiency at each of the varied peak output power levels to determine a new maximum driving current when a recording output power level of the semiconductor laser has changed from a previous recording output power level by a prescribed quantity or more in repeatedly performed recording operations, and the laser driving unit drives the semiconductor laser based on the newly determined maximum driving current.

11. The laser power control apparatus of claim 7, wherein the controller recalculates a new differential efficiency at each of the varied peak output power levels to determine a new maximum driving current when a recording speed has changed in repeatedly performed recording operations, and the laser driving unit drives the semiconductor laser based on the newly determined maximum driving current.

12. A laser power control method for controlling an output power level of a semiconductor laser used to record and reproduce data in and from a recording medium, comprising the steps of:

varying a peak output power level of the semiconductor laser in a stepwise manner to calculate a differential efficiency at each of the varied peak output power levels prior to a recording operation;

deriving a formula defining the differential efficiency as a function of peak output power level; and determine a maximum driving current required to drive the semiconductor laser at a target recording power level based on the formula.

13. The laser power control method of claim 12, further comprising the steps of:

recalculating a new differential efficiency at each of the varied peak output power levels to determine a new maximum driving current when a recording output power level of the semiconductor laser has changed from a previous recording output power level by a prescribed quantity or more in repeatedly performed recording operations; and driving the semiconductor laser based on the newly determined maximum driving current.

14. The laser power control method of claim 12, further comprising the steps of:

recalculating a new differential efficiency at each of the varied peak output power levels to determine a new maximum driving current when a recording speed has changed in repeatedly performed recording operations; and driving the semiconductor laser based on the newly determined maximum driving current.

15. An apparatus for recording and reproducing data in and from a recording medium, comprising:

a semiconductor laser configured to emit a laser beam at two or more levels of output power;

an optical system configured to guide the laser beam onto the recording medium;

a controller configured to vary a peak output power level of the semiconductor laser in a stepwise manner to calculate a differential efficiency at each of the varied peak output power levels prior to a recording operation and determine a maximum driving current required to drive the semiconductor laser at a target recording power, based on a relation between the differential efficiency and the peak output power level; and a laser driving unit configured to drive the semiconductor laser using the maximum driving current determined by the controller.

16. The apparatus of claim 15, wherein the laser driving unit includes two or more laser driving current sources, at least one of the laser driving current sources being structured by a digital-to-analog converter, and the controller calculates a full-scale setting value from the maximum driving current and supplies the full-scale setting value in a digital form to the digital-to-analog converter.

17. The apparatus of claim 15, wherein the controller recalculates a new differential efficiency at each of the varied peak output power levels to determine a new maximum driving current when a recording output power level of the semiconductor laser has changed from a previous recording output power level by a prescribed quantity or more in repeatedly performed recording operations, and the laser driving unit drives the semiconductor laser based on the newly determined maximum driving current.

18. The apparatus of claim 15, wherein the controller recalculates a new differential efficiency at each of the varied peak output power levels to determine a new maximum driving current when a recording speed has changed in repeatedly performed recording operations, and the laser driving unit drives the semiconductor laser based on the newly determined maximum driving current.

19. The apparatus of claim 15, further comprising a motor configured to rotate the recording medium, wherein the controller increases rotational speed of the motor as a recording position on the recording medium shifts to an outer periphery.

* * * * *